United States Patent
Suwabe et al.

(10) Patent No.: US 7,833,606 B2
(45) Date of Patent: Nov. 16, 2010

(54) CERAMIC HONEYCOMB STRUCTURE AND METHOD FOR PRODUCING CERAMIC HONEYCOMB STRUCTURE

(75) Inventors: Hirohisa Suwabe, Moka (JP); Yasuhiko Ohtsubo, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 12/303,466

(22) PCT Filed: Sep. 27, 2007

(86) PCT No.: PCT/JP2007/068874

§ 371 (c)(1),
(2), (4) Date: Dec. 4, 2008

(87) PCT Pub. No.: WO2008/047558

PCT Pub. Date: Apr. 24, 2008

(65) Prior Publication Data
US 2009/0142543 A1    Jun. 4, 2009

(30) Foreign Application Priority Data
Sep. 28, 2006  (JP) .............................. 2006-265107

(51) Int. Cl.
*B32B 3/12* (2006.01)
*C04B 35/64* (2006.01)

(52) U.S. Cl. .................... 428/116; 264/630
(58) Field of Classification Search ............. None
See application file for complete search history.

(56) References Cited

U.S. PATENT DOCUMENTS 6,808,663 B2 * 10/2004 Noguchi et al. ............... 264/44
6,818,580 B2 * 11/2004 Kumazawa et al. .......... 501/119

FOREIGN PATENT DOCUMENTS

| EP | 0 753 490 A1 | 1/1997 |
|---|---|---|
| EP | 1 125 704 A1 | 8/2001 |
| JP | 7-163823 A | 6/1995 |
| JP | 8-931 A | 1/1996 |
| JP | 9-77573 A | 3/1997 |
| JP | 2000-279729 A | 10/2000 |
| JP | 2001-340718 A | 12/2001 |
| JP | 2002-119871 A | 4/2002 |
| JP | 2002-326879 A | 11/2002 |
| JP | 2003-40687 A | 2/2003 |
| JP | 2004-76717 A | 3/2004 |
| WO | 01/15877 A1 | 3/2001 |

* cited by examiner

*Primary Examiner*—Gordon R Baldwin
(74) *Attorney, Agent, or Firm*—Sughrue Mion, PLLC

(57) ABSTRACT

A ceramic honeycomb structure having porous cell walls defining large numbers of flow paths, the cell walls having porosity of 55-70%, an average pore diameter of 10-40 μm, a concave area ratio CR (projected area ratio of portions lower than an average surface determined from cell wall surface roughness by a least square method) of 0.32-0.6, and an average concave depth $H_{concave}$ (average depth of portions lower than the average surface) of 0.02-0.1 mm.

8 Claims, 2 Drawing Sheets

CERAMIC HONEYCOMB STRUCTURE AND METHOD FOR PRODUCING CERAMIC HONEYCOMB STRUCTURE

CROSS REFERENCE TO RELATED APPLICATION

This application is a National Stage of International Application No. PCT/JP2007/068874 filed Sep. 27, 2007, claiming priority based on Japanese Patent Application No. 2006-265107, filed Sep. 28, 2006, the contents of all of which are incorporated herein by reference in their entirety.

FIELD OF THE INVENTION

The present invention relates to a ceramic honeycomb structure suitable for a ceramic honeycomb filter for capturing particulate matter in an exhaust gas discharged mainly from diesel engines to clean the exhaust gas, and its production method.

BACKGROUND OF THE INVENTION

Exhaust gases from diesel engines contain fine particles (particulate matter) mostly comprising carbon (soot, etc.) and high-boiling-point hydrocarbons, which are likely to adversely affect humans and the environment when discharged to the air. Accordingly, a ceramic honeycomb filter for removing the particulate matter to clean the exhaust gas, which may be called "honeycomb filter" below, has conventionally been mounted in an exhaust pipe connected to a diesel engine. As shown in FIGS. 1(*a*) and 1(*b*), a honeycomb filter 20 comprises a ceramic honeycomb structure 10 comprising porous cell walls 2 forming large numbers of flow paths 3, 4 and a peripheral wall 1, which may be called "honeycomb structure" below, and plugs 6a, 6b alternately sealing both ends 8, 9 of the flow paths 3, 4 in a checkerboard pattern. The exhaust gas enters the outlet-sealed flow paths 3 and exits from the inlet-sealed flow paths 4 through the cell walls 2 as shown by dotted arrows. While the exhaust gas passes through pores on and in the cell walls, the particulate matter is captured by pores on and in the cell walls.

As the cell walls 2 continues capturing particulate matter, their pores are clogged, resulting in increased pressure loss. A honeycomb filter can be regenerated by burning the accumulated particulate matter by a burner, a heater, etc. Alternatively, particulate matter is brown off by washing air and burned to regenerate the honeycomb filter. Recently conducted are a method of continuously burning particulate matter captured by pores (not shown) in cell walls 2 of a honeycomb filter 20 with a catalytic material comprising a platinum-group metal catalyst and a high-specific-surface-area material such as active alumina, which is carried on the cell walls 2 or in the pores, or a method of spraying an unburned fuel into an exhaust gas upstream of a honeycomb filter and burning it, thereby burning the captured particulate matter, etc.

The honeycomb filter 20 is required to have a high particulate-matter-capturing efficiency with a long capturing time and low pressure loss. Among them, the capturing time (time during which particulate matter can be captured at a certain pressure loss or less) is preferably as long as possible. A short capturing time necessitates the captured particulate matter to be burned frequently by heating with an electric heater or a burner, or by burning an injected fuel, resulting in much heating energy consumption, and poor fuel efficiency of diesel engines.

JP 7-163823 A discloses a porous ceramic honeycomb filter comprising cell walls having porosity of 45-60%, the relation between the specific surface area M ($m^2/g$) of all pores penetrating from their surfaces to their inside and the surface roughness N (µm) of the filter being 1000M+85N $\geq$530. It describes that such shape extends the capturing time, thereby reducing the number of regeneration operations. It further describes that when fine talc particles and coarse silica particles are used in combination, the coarse silica particles located on the surface increases the surface roughness N, and the fine talc particles increases small pores as a whole, thereby increasing the specific surface area M of pores. However, it is still insufficient to the problem of a short capturing time. Particularly because particulate matter in the exhaust gas has become smaller and more uniform due to the improvement of diesel engines (high-pressure fuel injection) recently, the accumulated particulate matter increases the pressure loss more, so that the capturing time tends to become shorter.

JP 8-931 A discloses a honeycomb filter having porosity of 40-55%, an average pore diameter of 5-50 µm, and a surface valley level (surface pore area ratio in a portion lower than an average surface determined by surface roughness measurement) of 20% or less. It describes that because particulate matter captured on the filter surface is easily detached, this filter has good regeneration efficiency with washing air, suffering less pressure loss increase even after a long period of use. Because the honeycomb filter described in JP 8-931 A has a small portion lower than the average surface determined by the roughness of the surface on which particulate matter is predominantly captured, the captured particulate matter is well detached from the honeycomb filter by washing. However, because this honeycomb filter has a small portion in which particulate matter is captured, the accumulated particulate matter tends to drastically increase the pressure loss. Particularly because particulate matter in the exhaust gas has become smaller and more uniform due to the improvement of diesel engines (high-pressure fuel injection) recently, particulate matter accumulated in the honeycomb filter increases the pressure loss more, so that the capturing time becomes shorter.

WO 01/15877 describes that when the porosity was increased to change the valley level from 15% to 30% in a particulate-matter-removing filter comprising a cordierite honeycomb structure having a cell wall thickness of 0.3 mm and a cell density of 200 cpsi, the capturing ratio was improved by about 5% in a usual flat-wall honeycomb structure, and about 10% in a wave-wall honeycomb structure. However, the valley level of about 30% is still insufficient to increase the capturing time, and a further increase in the porosity lowers the strength of the honeycomb structure. Accordingly, it is difficult to provide a honeycomb filter with long capturing time, high strength, and low pressure loss.

OBJECT OF THE INVENTION

Accordingly, an object of the present invention is to provide a ceramic honeycomb structure having an elongated capturing time due to less pressure loss increase even when particulate matter is captured, and suitable for a high-strength honeycomb filter, and its production method.

DISCLOSURE OF THE INVENTION

As a result of extensive investigation in view of the above object, the inventors have found that by regulating the porosity, average pore diameter and surface shape of cell walls of a ceramic honeycomb structure in particular ranges, a honeycomb filter can be provided with reduced pressure loss increase, and thus elongated capturing time. The present invention has been completed based on such findings.

Thus, the ceramic honeycomb structure of the present invention has large numbers of flow paths surrounded by porous cell walls, the cell walls having porosity of 55-70%, an average pore diameter of 10-40 μm, a concave area ratio CR (projected area ratio of portions lower than an average surface determined from cell wall surface roughness by a least square method) of 0.32-0.6, and an average concave depth $H_{concave}$ (average depth of portions lower than the average surface) of 0.02-0.1 mm.

The CR is preferably 0.4-0.5, and the $H_{concave}$ is preferably 0.03-0.06 mm.

The cell walls preferably have air permeability of $1 \times 10^{-12}$ m$^2$ to $8 \times 10^{-12}$ m$^2$. The cell walls preferably has porosity of 60-70% and an average pore diameter of 15-30 μm. The thermal expansion coefficient of the cell walls in a flow path direction is preferably $4 \times 10^{-7}$/° C. to $15 \times 10^{-7}$/° C. between 40° C. and 800° C.

The method of the present invention for producing a ceramic honeycomb structure comprises mixing and blending cordierite-forming material powder with a pore-forming material to obtain a moldable material, and molding, drying and sintering the moldable material, the cordierite material powder containing 5-20% by mass of silica powder having a BET specific surface area of 1-3 m$^2$/g and an aspect ratio of 1.2-5, the pore-forming material being a foamed resin having an average particle size of 40-80 μm, 6-15 parts by mass of the foamed resin being added to 100 parts by mass of the cordierite-forming material powder.

DESCRIPTION OF THE BEST MODE OF THE INVENTION

[1] Ceramic Honeycomb Structure

Figure 1A:
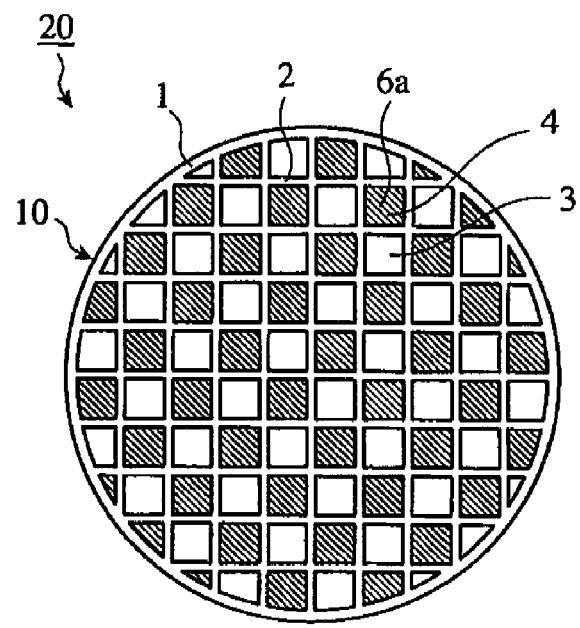
FIG. 1(a) is a schematic cross-sectional view showing one example of the ceramic honeycomb filters of the present invention perpendicularly to its flow paths.
Figure 1B:
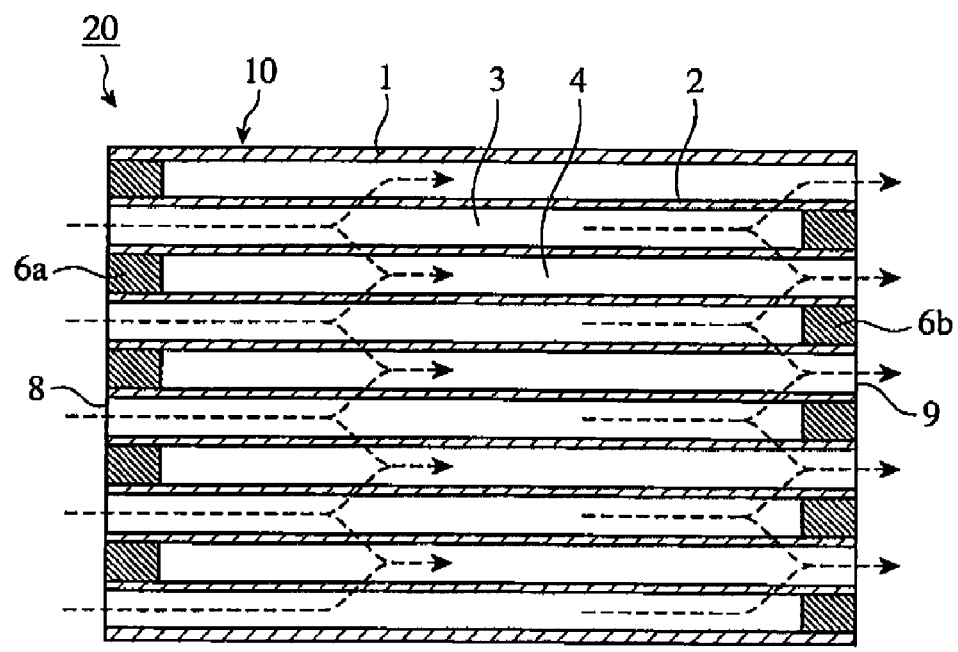
FIG. 1(b) is a schematic cross-sectional view showing one example of the ceramic honeycomb filters of the present invention in parallel with its flow paths.

The ceramic honeycomb structure of the present invention has large numbers of flow paths surrounded by porous cell walls, the cell walls having porosity of 55-70%, an average pore diameter of 10-40 μm, a concave area ratio CR (projected area ratio of portions lower than an average surface determined from cell wall surface roughness by a least square method) of 0.32-0.6, and an average concave depth $H_{concave}$ (average depth of portions lower than the average surface) of 0.02-0.1 mm. Such shape can provide a honeycomb structure with reduced pressure loss increase when particulate matter is captured, as well as high strength.

(1) Concave Area Ratio, Average Concave Depth and Average Convex Height

The concave area ratio and the average concave depth are measured by the flowing methods. Using a three-dimensional surface roughness meter, an arbitrary region (0.8 mm×0.8 mm) of a cell wall surface is scanned by a stylus having a tip end having a radius of curvature of 2 μm at an angle of 60° in both X and Y directions, to obtain 160,000 surface roughness data in total with an interval of 2 μm. An average surface is determined from these data by a least square method, and the total area (projected onto the average surface) of portions lower than the average surface is divided by the measured area (0.8$^2$ mm$^2$) to obtain the concave area ratio CR. Namely, CR is a projected area ratio of portions lower than the average surface determined from cell wall surface roughness by a least square method. For instance, CR of 0.3 substantially corresponds to the valley level (described in JP 8-931 A and WO 01/15877) of 30%. The average concave depth $H_{concave}$ is an average depth of concaves from the average surface in the measured area (0.8 mm×0.8 mm).

With the concave area ratio CR in a range of 0.32-0.6 and the average concave depth $H_{concave}$ in a range of 0.02-0.1 mm, the cell wall surface has concaves suitable for capturing particulate matter, resulting in reduced pressure loss increase when particulate matter is captured.

When the CR is less than 0.32 (too small concave area ratio), the captured particulate matter easily clogs the concaves, failing to reduce the pressure loss increase. When the CR exceeds 0.6 (too large concave area ratio), the concaves have too large openings, resulting in a honeycomb structure having reduced strength, which cannot substantially be used for a honeycomb filter. The CR is more preferably in a range of 0.35-0.5, most preferably 0.4-0.5.

Figure 3:
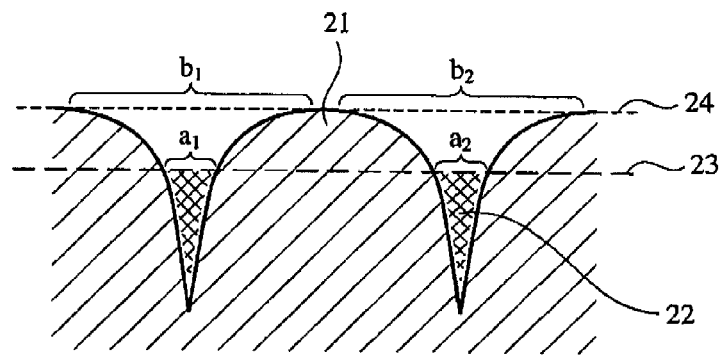
FIG. 3 is a schematic cross-sectional view showing pores in the cell walls of the conventional ceramic honeycomb structure.
Figure 4:
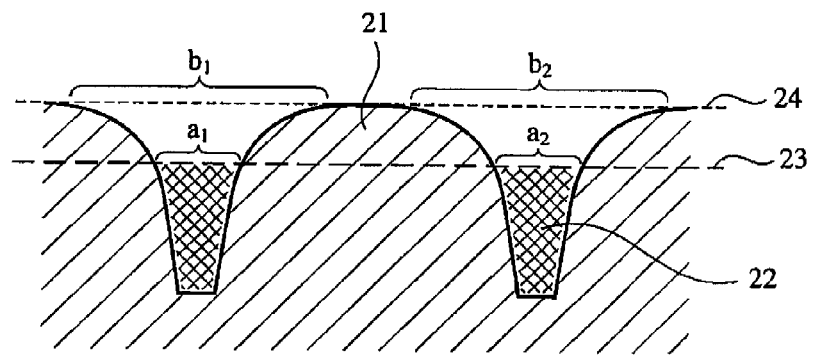
FIG. 4 is a schematic cross-sectional view showing pores in the cell walls of the ceramic honeycomb structure of the present invention.

A large CR does not simply mean that the cell wall surface has a large pore opening area ratio. FIGS. 3 and 4 schematically show the cross-sectional shapes of pores. The average surface 23 is a surface on which the total of the square of the measured area of convexes 21 and concaves 22 is minimum. The CR is an area ratio (sum of a1, a2 . . . ) of concaves 22 projected onto the average surface. On the other hand, the opening area ratio of the cell wall surface is an area ratio (sum of b1, b2 . . . ) of openings on the surface 24. For instance, when the cell wall surface has a large opening area ratio and a small CR as shown in FIG. 3, the particulate matter easily enter pores, but it tends to be accumulated in deep portions of the pores because of small CR, resulting in premature increase in pressure loss. On the other hand, in the case of the ceramic honeycomb structure of the present invention, which has a large CR as shown in FIG. 4, the pores are not easily clogged by particulate matter, resulting in reduced pressure loss increase.

The crux of the present invention is to provide cell walls having as relatively low porosity as 70% or less with CR of 0.3 or more, although cell walls having as high porosity as about 80% are conventionally needed to obtain CR of 0.3 or more. This can reduce pressure loss increase without lowering the strength of a ceramic honeycomb structure. Selected to obtain such a honeycomb structure are ceramic materials melting at relatively low temperatures and having as large a BET specific surface area as 1-3 m$^2$/g and as large an aspect ratio as 1.2-5 (for instance, silica powder in the case of cordierite), and a foamed resin having an average particle size of 40-80 μm as a pore-forming material.

When $H_{concave}$ is less than 0.02 mm, the concaves are too shallow, failing to reduce pressure loss increase when particulate matter is captured. When $H_{concave}$ exceeds 0.1 mm, the cell wall surface has too deep concaves, whose tips act as starting points of reducing the strength of the cell walls. $H_{concave}$ is more preferably in a range of 0.03-0.06 mm.

In the ceramic honeycomb structure, an average convex height $H_{convex}$ (average height of convexes from the average surface) is preferably 0.1 mm or less, to keep resistance low when an exhaust gas passes through the flow paths.

(2) Porosity and Average Pore Diameter

The ceramic honeycomb structure of the present invention comprises cell walls having porosity of 55-70% and an average pore diameter of 10-40 μm, thereby reducing the pressure loss of a honeycomb filter in an initial stage before capturing particulate matter. When the cell walls have porosity of less than 55%, the pressure loss of a honeycomb filter is high in an initial stage. When the porosity exceeds 70%, the honeycomb structure has reduced strength. The porosity is more preferably in a range of 60-70%. When the average pore diameter is less than 10 μm, the pressure loss of a honeycomb filter is high in an initial stage. When the average pore diameter exceeds 40 μm, the ceramic honeycomb structure has reduced strength. The average pore diameter is more preferably in a range of 15-30 μm.

(3) Air Permeability

In the ceramic honeycomb structure, the cell walls preferably have air permeability of $1\times10^{-12}$ m² to $8\times10^{-12}$ m². With cell walls having air permeability in this range, the pressure loss of a honeycomb filter can be reduced in an initial stage, and further the pressure loss increase when particulate matter is captured can be reduced. The air permeability is more preferably $3\times10^{-12}$ m² to $7\times10^{-12}$ m². In the present invention, the air permeability is determined by the formula (1).

$$k=(\eta QT)/(\Delta PA) \qquad (1),$$

wherein k is air permeability (m²), η is the viscosity (MPa·second) of air at room temperature, T is sample thickness (m), Q is the flow rate (m³) of air passing through the sample, A is a sample area (m²), and ΔP is a pressure difference (MPa) in a sample thickness direction. The air permeability k is determined by measuring the flow rate of air passing through a cell wall sample cut out of the ceramic honeycomb filter, which is fixed to a holder and subjected to air pressure difference on both sides.

(4) Thermal Expansion Coefficient

In the ceramic honeycomb structure, the thermal expansion coefficient of cell walls in a flow path direction is preferably $4\times10^{-7}$/° C. to $15\times10^{-7}$/° C. between 40° C. and 800° C. The ceramic honeycomb structure having such a thermal expansion coefficient exhibits excellent thermal shock resistance, less likely to be broken by drastic temperature change. The more preferred thermal expansion coefficient of cell walls in a flow path direction is $5\times10^{-7}$/° C. to $12\times10^{-7}$/° C. between 40° C. and 800° C.

(5) Cell Wall Thickness and Pitch

The ceramic honeycomb structure preferably has cell wall thickness of 0.1-0.5 mm. When the cell wall thickness is less than 0.1 mm, the honeycomb structure has low strength because it is a porous body comprising cell walls with porosity of 55-70%. On the other hand, when the cell wall thickness exceeds 0.5 mm, an exhaust gas undergoes large resistance when passing through the cell walls, even though the cell walls have as high porosity as 55-70%, so that a honeycomb filter suffers large pressure loss. The more preferred cell wall thickness is 0.2-0.4 mm.

The cell wall pitch is preferably 1-3 mm. When the cell wall pitch is less than 1 mm, a honeycomb filter suffers large pressure loss at the inlet, because the honeycomb structure inlet has a small opening area. When the cell wall pitch exceeds 3 mm, the filter has a smaller area, resulting in the reduced amount of particulate matter captured.

(6) Shape of Flow Paths

Though not particularly restricted, the shape of flow paths defined by the cell walls of the ceramic honeycomb structure is preferably triangular, rectangular, hexagonal or circular from the aspect of production. The flow paths are preferably rectangular, from the aspect of the strength and filtering area of a honeycomb structure. Because curved cell walls give large resistance to an exhaust gas passing through the flow paths, the cell walls are preferably flat. In a cross section perpendicular to the flow paths, the maximum deviation (maximum amplitude) between a straight line connecting intersections of cell walls defining one flow path and a centerline of a cell wall is preferably less than 100% of the cell wall thickness. The maximum amplitude is more preferably less than 50%, further preferably less than 30%, of the cell wall thickness.

(7) Materials

Materials forming the cell walls and plugs of the ceramic honeycomb filter are preferably those having excellent heat resistance, because the present invention is used to remove particulate matter from an exhaust gas discharged mainly from diesel engines. Specifically, a ceramic material comprising as a main crystal at least one selected from the group consisting of cordierite, alumina, mullite, silicon nitride, sialon, silicon carbide, aluminum titanate, aluminum nitride and LAS is preferable. A material comprising cordierite or aluminum titanate as a main crystal is particularly preferable because it is inexpensive and has excellent heat resistance and corrosion resistance as well as low thermal expansion. Among them, the cordierite is most preferable. Although materials forming the cell walls and the plugs may be different, they are preferably the same to minimize stress generated by the difference in a thermal expansion coefficient between the cell walls and the plugs.

[2] Production Method

An example of the method of the present invention for producing a ceramic honeycomb structure will be explained without intension of restriction. A moldable material, which becomes a material such as cordierite, alumina, mullite, silicon nitride, sialon, silicon carbide, aluminum titanate, aluminum nitride, LAS, etc. by sintering, is first prepared. This moldable material may be prepared, for instance, by blending cordierite-forming material powder, etc. with water, a binder and a pore-forming material. The moldable material is extrusion-molded by a known honeycomb-structure-molding die, and dried to provide a dried honeycomb structure.

The dried honeycomb structure is machined to remove its peripheral portion, and sintered to provide a ceramic honeycomb structure. With the peripheral portion machined, the honeycomb structure has open grooves extending substantially longitudinally on its periphery. Both end portions of the desired flow paths of the ceramic honeycomb structure are filled with a plugging material slurry, and sintered so that plugs are made integral with the cell walls. The cell walls and the plugs may be sintered simultaneously. Further, the grooves on the periphery of the ceramic honeycomb structure are coated with a material comprising, for instance, the same ceramic aggregates as those for the cell walls and an inorganic binder to form a peripheral wall, and if necessary, sintered to integrate the cell walls and the peripheral wall, thereby obtaining a ceramic honeycomb filter.

The removal of the peripheral portion may be conducted using a cylinder grinder, after the dried honeycomb structure is sintered. Thus, after removing the peripheral portion easily deformable during extrusion molding, a peripheral wall comprising ceramic aggregates and an inorganic binder can be formed to provide a ceramic honeycomb filter with high strength, which has high durability even when mounted to a diesel engine.

The ceramic honeycomb structure having porosity of 55-70% and an average pore diameter of 10-40 μm, and comprising cell walls whose surfaces have a concave area ratio CR of 0.32-0.6 and an average concave depth $H_{concave}$ of 0.02-0.1 mm is obtained by using ceramic material powder having a particular shape (for instance, silica powder having a particular shape when the honeycomb structure is made of cordierite), and a foamed resin having an average particle size of 40-80 μm as a pore-forming material. Because the silica powder is molten at relatively low temperatures during sintering, pores corresponding to the powder shapes are formed. With 5-20% by mass of silica particles having such shapes as to have a BET specific surface area of 1-3 $m^2/g$ and an aspect ratio of 1.2-5 added to the cordierite material powder, the cell walls are provided with concaves effectively capturing particulate matter on the surface. The silica powder may be quartz, cristobalite, fused silica, etc., and the fused silica is preferable to form concaves effectively.

6-15 parts by mass of the foamed resin having an average particle size of 40-80 μm is added to 100 parts by mass of the ceramic materials. A combination of this foamed resin with the silica powder provides as relatively low porosity as 70% or less, and as large CR as 0.3 or more.

When the ceramic honeycomb structure is made of cordierite as a main crystal, it is preferable to use silica having an average particle size of 5-25 μm, talc having an average particle size of 8-15 μm, and alumina having an average particle size of 4-20 μm. Particularly, alumina powder preferably has a pore size distribution (by volume) having one or more peaks in particle size regions of 0.5-10 μm and 10-80 μm, respectively.

The use of such ceramic materials provides a ceramic honeycomb structure comprising cell walls having rough surfaces with concaves at a proper ratio.

The present invention will be described in detail with reference to Examples below without intension of limitation.

EXAMPLE 1

The powders of kaolin, talc, silica A (fused silica), alumina and aluminum hydroxide shown in Tables 1 and 2 were weighed to the formulation A shown in Table 3 to obtain a cordierite-forming material powder. Added to 100 parts by mass of this cordierite-forming material powder were 6 parts by mass of a foamed resin having an average particle size of 60 μm as a pore-forming material, and methylcellulose and hydroxypropylmethylcellulose as a binder. After fully dry-mixed, water was added, and blending was conducted to prepare a moldable ceramic material. The specific surface area of each powder was measured by a BET method, and the average particle size of each powder was measured by a laser diffraction method. The aspect ratio was determined by measuring the largest diameters and the smallest diameters of arbitrary 10 particles on a SEM photograph, and averaging (largest diameter)/(smallest diameter) ratios. This moldable material was extrusion-molded, cut and dried to obtain a dried body having a honeycomb structure. This dried body was machined to remove its peripheral portion to obtain a dried honeycomb structure having grooves extending substantially longitudinally on the surface, which was sintered at 1400° C. in a batch furnace to obtain a ceramic honeycomb structure. This ceramic honeycomb structure with open grooves extending substantially longitudinally had an outer diameter of 265 mm, a length of 304 mm, a cell wall thickness of 0.3 mm, and a cell wall pitch of 1.5 mm.

TABLE 1

| Ceramic Material | Specific Surface Area ($m^2/g$) | Average Particle Size (μm) |
|---|---|---|
| Kaolin | 15 | 3 |
| Talc | 6 | 13 |
| Alumina[1] | 4 | 8 |
| Aluminum Hydroxide | 5 | 2.7 |

Note:
[1]The particle size distribution had peaks at 5 μm and 20 μm, respectively.

TABLE 2

| Silica | Specific Surface Area ($m^2/g$) | Aspect Ratio | Average Particle Size (μm) |
|---|---|---|---|
| Silica A | 2.2 | 3.5 | 20 |
| Silica B | 4.5 | 4.2 | 6 |
| Silica C | 0.6 | 1.1 | 46 |

TABLE 3

| Ceramic Material | Formulation (% by mass) | | | | |
|---|---|---|---|---|---|
| | A | B | C | D | E |
| Kaolin | 7.6 | 18.9 | 10.4 | 7.6 | 7.6 |
| Talc | 41.0 | 40.8 | 41.0 | 41.0 | 41.0 |
| Alumina | 22.8 | 19.2 | 22.0 | 22.8 | 22.8 |
| Aluminum Hydroxide | 11.1 | 9.3 | 10.6 | 11.1 | 11.1 |
| Silica A | 17.5 | 11.8 | 16 | — | — |
| Silica B | — | — | — | 17.5 | — |
| Silica C | — | — | — | — | 17.5 |

The desired flow paths in both end portions of the ceramic honeycomb structure were filled with a plugging material slurry comprising a cordierite-forming material, and the resultant plugs were sintered at 1400° C. to make them integral with the cell walls. Further, grooves on the periphery of the ceramic honeycomb structure were coated with a material comprising cordierite aggregates having an average particle size of 15 μm and colloidal silica to form a peripheral wall, and dried to make the peripheral wall integral with the cell walls, thereby obtaining a ceramic honeycomb filter having an outer diameter of 267 mm and a length of 304 mm (filter volume: 17 L).

EXAMPLES 2-5

Ceramic honeycomb filters of Examples 2, 3, 4 and 5 were produced in the same manner as in Example 1 except for using as a pore-forming material a foamed resin having an average particle size of 60 μm in an amount of 8 parts by mass, 10 parts by mass, 12 parts by mass and 14 parts by mass, respectively.

EXAMPLES 6 and 7

Ceramic honeycomb filters of Examples 6 and 7 were produced in the same manner as in Example 3 except for changing the formulation of the ceramic material powder to the formulations B and C shown in Table 3.

COMPARATIVE EXAMPLES 1 and 2

Ceramic honeycomb filters of Comparative Examples 1 and 2 were produced in the same manner as in Example 1 except for using a foamed resin having an average particle size of 60 μm in an amount of 5 parts by mass and 16 parts by mass, respectively, as a pore-forming material.

COMPARATIVE EXAMPLES 3 and 4

Ceramic honeycomb filters of Comparative Examples 3 and 4 were produced in the same manner as in Example 2 except for using silica B powder and silica C powder in place of the silica A powder.

COMPARATIVE EXAMPLES 5 and 6

Ceramic honeycomb filters were produced in the same manner as in Example 2, except for using 40 parts by mass of graphite powder having an average particle size of 20 μm in Comparative Example 5, and 8 parts by mass of a foamed resin having an average particle size of 86 μm in Comparative Example 6, in place of the foamed resin having an average particle size of 60 μm.

COMPARATIVE EXAMPLE 7

According to Example 13 described in JP 8-931 A, talc having an average particle size of 10 μm, silica having an average particle size of 40 μm, kaolin having an average particle size of 3 μm, alumina having an average particle size of 1.8 μm, and other cordierite-forming materials were mixed to have a cordierite composition comprising 42-56% by mass of $SiO_2$, 30-45% by mass of $Al_2O_3$ and 12-16% by mass of MgO, and this mixture was blended with 20% by mass of graphite, and further with methylcellulose, a surfactant and water, extrusion-molded, and dried to form a dried honeycomb structure. Thereafter, the dried body was machined to remove a peripheral portion, sintered at 1400° C., and provided with plugs and a peripheral wall in the same manner as in Example 1, to obtain a ceramic honeycomb filter of Comparative Example 7 having an outer diameter of 267 mm, a length of 304 mm (filter volume: 17 L), a cell wall thickness of 0.3 mm, and a cell wall pitch of 1.5 mm.

With respect to each ceramic honeycomb filter of Examples 1-7 and Comparative Examples 1-7, pressure difference between the inlet and the outlet Was measured by a pressure test stand to determine pressure loss, which was evaluated by the flowing standard.

Excellent: Much lower pressure loss than permitted in practical Applications (passed),
Good: Pressure loss equal to or lower than a practically permitted level (passed), and
Poor: Pressure loss exceeding a practically permitted level (failed).

Further, 17 g (1 g per 1 L of the filter volume) of carbon powder having a particle size of 0.042 μm was added at a speed of 3 g/h to an air stream supplied to the ceramic honeycomb filter at a flow rate of 10 $Nm^3$/min. A pressure loss increase ratio was calculated from the pressure loss before and after adding the carbon powder by the flowing formula:

Pressure loss increase ratio (%) =100 × [(pressure loss after 1 g/L of carbon was added)−(pressure loss before carbon was added)] /(pressure loss before carbon was added).

The pressure loss increase ratio was evaluated by the following standard.

Excellent: 15% or less of a pressure loss increase ratio (passed),
Good: 20% or less of a pressure loss increase ratio (passed),
Poor: More than 20% of a pressure loss increase ratio (failed).

A test piece was cut out of each ceramic honeycomb filter to measure porosity, an average pore diameter, a concave area ratio CR (projected area ratio of portions lower than an average surface determined from cell wall surface roughness by a least square method), an average concave depth $H_{concave}$ (average depth of portions lower than the average surface), an average convex height $H_{convex}$ (average height of convexes from the average surface), air permeability of a cell wall, a thermal expansion coefficient of a cell wall in a flow path direction between 40° C. and 800° C., and an A-axis compression strength of a cell wall.

The porosity and the average pore diameter were measured by mercury intrusion porosimetry using AutoPore III available from Micromeritics. A test piece cut out of each ceramic honeycomb filter was put in a measurement cell, and evacuated. Mercury was then introduced under pressure. From the relation of the pressure and the volume of mercury intruded into pores in the test piece, the relation of a pore diameter and a cumulative pore volume was determined. The mercury-introducing pressure was 0.5 psi ($0.35 \times 10^{-3}$ $kg/mm^2$), and the pore diameter was calculated using a contact angle of 130°, and a surface tension of 484 dyne/cm. The porosity was calculated from the measured total pore volume, assuming that cordierite has a true density of 2.52 $g/cm^3$.

Figure 2:
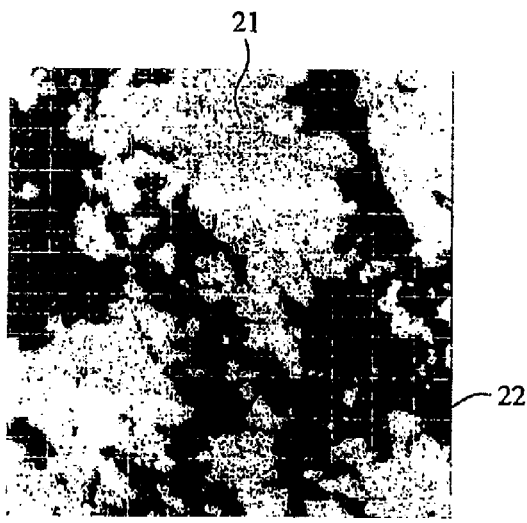
FIG. 2 is a view showing the measurement results of the surface roughness of the ceramic honeycomb structure of Example 3.

The concave area ratio CR, the average concave depth $H_{concave}$ and the average convex height $H_{convex}$ were measured by the following methods. Using a three-dimensional surface roughness meter available from Mitutoyo Corporation, an arbitrary region (0.8 mm×0.8 mm) of a cell wall surface was scanned with a stylus having a tip end having a radius of curvature of 2 μm and an angle of 60° under a load of 85 mgf, to obtain 160,000 surface roughness data in total in both X and Y directions at an interval of 2 μm. An average surface was determined from the roughness data by a least square method, and a total area of concaves (portions lower than this average surface) projected onto the average surface was divided by the measured area of 0.8 mm×0.8 mm to determine a concave ratio CR. $H_{concave}$ is an average depth of concaves from the average surface in the measured area of 0.8 mm×0.8 mm, and $H_{convex}$ is an average height of convexes from the average surface in the measured area of 0.8 mm×0.8 mm. FIG. 2 shows a convex 21 and a concave 22 when the cell wall of Example 3 is cut along the average surface.

The air permeability of the cell walls was measured by Perm-Porometer available from Porous Materials Inc. The air permeability k was determined by measuring the flow rate of air passing through a cell wall sample cut out of the ceramic honeycomb filter, which was mounted to a holder with air pressure difference on both surfaces.

The thermal expansion coefficient was measured on a test piece of 4.8 mm×4.8 mm×50 mm mounted to a thermomechanical analyzer such that its longitudinal direction was aligned with the flow paths of the ceramic honeycomb structure. The thermal expansion coefficient was an average value between 40° C. and 800° C.

The A-axis compression strength was measured according to "a method of testing a ceramic monolith carrier for an exhaust-gas-cleaning catalyst for automobiles," a Standard M505-87 of the Society of Automotive Engineers of Japan.

The specific surface area M (m²/g) of pores was measured by Autopore III available from Micromeritics together with the porosity and the average pore diameter. The cell wall surface roughness was measured by a surface roughness meter.

The maximum amplitude of cell walls was determined by measuring the maximum difference (maximum amplitude) between a straight line connecting intersections of pluralities of cell walls constituting one flow path and a centerline of a cell wall in a cross section perpendicular to the flow path at four points for each of five flow paths, and averaging the resultant 20 measurement data. These results are shown in Table 4.

TABLE 4

| No. | Ceramic Formulation | Pore-Forming Material Type | Amount (parts by mass) |
|---|---|---|---|
| Example 1 | Formulation A | Foamed Resin of 60 μm[1] | 6 |
| Example 2 | Formulation A | Foamed Resin of 60 μm[1] | 8 |
| Example 3 | Formulation A | Foamed Resin of 60 μm[1] | 10 |
| Example 4 | Formulation A | Foamed Resin of 60 μm[1] | 12 |
| Example 5 | Formulation A | Foamed Resin of 60 μm[1] | 14 |
| Example 6 | Formulation B | Foamed Resin of 60 μm[1] | 10 |
| Example 7 | Formulation C | Foamed Resin of 60 μm[1] | 10 |
| Comparative Example 1 | Formulation A | Foamed Resin of 60 μm[1] | 5 |
| Comparative Example 2 | Formulation A | Foamed Resin of 60 μm[1] | 16 |
| Comparative Example 3 | Formulation D | Foamed Resin of 60 μm[1] | 8 |
| Comparative Example 4 | Formulation E | Foamed Resin of 60 μm[1] | 8 |
| Comparative Example 5 | Formulation A | Graphite Powder | 40 |
| Comparative Example 6 | Formulation A | Foamed Resin of 86 μm[2] | 8 |
| Comparative Example 7 | Formulation of JP 8-931 A | Graphite Powder | 20 |

| No. | Porosity (%) | Average Pore Diameter (μm) | CR | $H_{concave}$ (mm) | Air Permeability ($10^{-12}$ m²) |
|---|---|---|---|---|---|
| Example 1 | 55 | 13 | 0.32 | 0.023 | 2.8 |
| Example 2 | 60 | 19 | 0.35 | 0.052 | 3.3 |
| Example 3 | 63 | 24 | 0.49 | 0.039 | 3.5 |
| Example 4 | 66 | 28 | 0.51 | 0.057 | 3.7 |
| Example 5 | 70 | 38 | 0.53 | 0.098 | 7.2 |
| Example 6 | 62 | 21 | 0.40 | 0.033 | 2.9 |
| Example 7 | 63 | 23 | 0.50 | 0.046 | 3.1 |
| Comparative Example 1 | 53 | 9 | 0.30 | 0.023 | 2.1 |
| Comparative Example 2 | 72 | 42 | 0.56 | 0.085 | 8.1 |
| Comparative Example 3 | 60 | 16 | 0.24 | 0.029 | 9.6 |
| Comparative Example 4 | 60 | 30 | 0.63 | 0.087 | 5.5 |
| Comparative Example 5 | 58 | 14 | 0.38 | 0.015 | 7.0 |
| Comparative Example 6 | 60 | 42 | 0.53 | 0.110 | 8.2 |
| Comparative Example 7 | 55 | 18 | 0.26 | 0.015 | 2.4 |

| No. | Thermal Expansion Coefficient ($10^{-7}$/° C.) | Pressure Loss | Pressure Loss Increase Ratio | A-axis compression Strength (MPa) | Maximum Amplitude of Cell Walls (%) |
|---|---|---|---|---|---|
| Example 1 | 7 | Good | Good | 4.3 | 2 |
| Example 2 | 8 | Excellent | Good | 4.2 | 5 |
| Example 3 | 8 | Excellent | Excellent | 3.9 | 8 |
| Example 4 | 8 | Excellent | Excellent | 3.6 | 15 |
| Example 5 | 7 | Excellent | Excellent | 3.0 | 23 |
| Example 6 | 6 | Good | Excellent | 4.0 | 15 |
| Example 7 | 6 | Good | Excellent | 4.1 | 12 |
| Comparative Example 1 | 7 | Poor | Good | 4.6 | 3 |
| Comparative Example 2 | 7 | Excellent | Excellent | 1.8 | 31 |

TABLE 4-continued

| | | | | | |
|---|---|---|---|---|---|
| Comparative Example 3 | 7 | Good | Poor | 4.5 | 18 |
| Comparative Example 4 | 9 | Excellent | Excellent | 2.0 | 8 |
| Comparative Example 5 | 7 | Good | Poor | 4.1 | 4 |
| Comparative Example 6 | 11 | Excellent | Good | 1.9 | 11 |
| Comparative Example 7 | 3 | Poor | Poor | 4.7 | 3 |

Note:
[1]Foamed resin having an average particle size of 60 μm.
[2]Foamed resin having an average particle size of 86 μm.

Note: Expressed by a ratio (%) of the maximum amplitude of the cell wall to the cell wall thickness.

As shown in Table 4, because each ceramic honeycomb filter of Examples 1-7 formed by the ceramic honeycomb structure of the present invention had cell wall porosity of 55-70%, an average pore diameter of 10-40 μm, a concave area ratio CR of 0.32-0.6, and $H_{concave}$ of 0.02-0.1 mm, it has low carbon-capturing pressure loss, which led to small pressure loss increase when particulate matter was captured, and an A-axis compression strength of 3 MPa or more. On the other hand, the ceramic honeycomb filter of Comparative Example 1 was evaluated as "failed" (Poor) with respect to pressure loss because its porosity was less than 55%, and the ceramic honeycomb filter of Comparative Example 2 had low A-axis compression strength because the porosity exceeded 70%. The ceramic honeycomb filters of Comparative Examples 3 and 7 suffered high carbon-capturing pressure loss, and large pressure loss increase when particulate matter was captured, because their CR was less than 0.32. The ceramic honeycomb filter of Comparative Example 4 had low A-axis compression strength because its CR exceeded 0.6. The ceramic honeycomb filter of Comparative Example 5 had high carbon-capturing pressure loss, and large pressure loss increase when particulate matter was captured, because its $H_{concave}$ was 0.02 mm or less despite its CR in a range of 0.32-0.6. The ceramic honeycomb filter of Comparative Example 6 had low A-axis compression strength, because its $H_{concave}$ was 0.1 mm or more despite its CR in a range of 0.32-0.6. The ceramic honeycomb filter described in JP 8-931 A had high carbon-capturing pressure loss, and large pressure loss increase when particulate matter was captured.

EFFECTS OF THE INVENTION

Because the ceramic honeycomb structure of the present invention has rough cell wall surfaces, with the ratio and depth of concaves in proper ranges, the honeycomb filter suffers less pressure loss increase when particulate matter is captured, so that it has a prolonged carbon-capturing time and improved strength.

What is claimed is:

1. A ceramic honeycomb structure having porous cell walls defining large numbers of flow paths, said cell walls having porosity of 55-70%, an average pore diameter of 10-40 μm, a concave area ratio CR (projected area ratio of portions lower than an average surface determined from cell wall surface roughness by a least square method) of 0.32-0.6, and an average concave depth $H_{concave}$ (average depth of portions lower than the average surface) of 0.02-0.1 mm, wherein said honeycomb structure is produced from cordierite-forming material powder containing 5-20% by mass of silica powder having a BET specific surface area of 1-3 m²/g and an aspect ratio of 1.2-5, and a pore-forming material consisting essentially of a foamed resin having an average particle size of 40-80 μm and added in an amount of 6-15 parts by mass to 100 parts by mass of said cordierite-forming material powder.

2. The ceramic honeycomb structure according to claim 1, wherein said CR is 0.4-0.5.

3. The ceramic honeycomb structure according to claim 1, wherein said $H_{concave}$ is 0.03-0.06 mm.

4. The ceramic honeycomb structure according to claim 1, wherein said cell walls have an air permeability of $1 \times 10^{-12}$ m² to $8 \times 10^{-12}$ m².

5. The ceramic honeycomb structure according to claim 1, wherein said cell walls have a porosity of 60-70% and an average pore diameter of 15-30 μm.

6. The ceramic honeycomb structure according to claim 1, wherein said cell walls have a thermal expansion coefficient of $4 \times 10^{-7}$/° C. to $15 \times 10^{-7}$/° C. in a flow path direction between 40° C. and 800° C.

7. A method for producing a ceramic honeycomb structure as claimed in claim 1 comprising mixing and blending a cordierite-forming material powder with a pore-forming material to form a moldable material, and molding, drying and sintering said moldable material, said cordierite-forming material powder containing 5-20% by mass of silica powder having a BET specific surface area of 1-3 m²/g and an aspect ratio of 1.2-5, and said pore-forming material being a foamed resin having an average particle size of 40-80μm and added in an amount of 6-15 parts by mass to 100 parts by mass of said cordierite-forming material powder.

8. The ceramic honeycomb structure according to claim 1, wherein the pore-forming material consist of foamed resin.

* * * * *